United States Patent [19]

Rosen

[11] 4,101,442
[45] Jul. 18, 1978

[54] NON-AQUEOUS ANTIFOAM COMPOSITIONS

[75] Inventor: Meyer Robert Rosen, Spring Valley, N.Y.

[73] Assignee: Union Carbide Corporation, New York, N.Y.

[21] Appl. No.: 691,393

[22] Filed: Jun. 1, 1976

[51] Int. Cl.$^2$ .............................................. B01D 17/00
[52] U.S. Cl. ..................................... 252/358; 252/321
[58] Field of Search .......... 252/358, 356, 321, DIG. 1

[56] References Cited

U.S. PATENT DOCUMENTS

| 3,015,645 | 1/1962 | Tyler | 260/46.5 R |
|---|---|---|---|
| 3,024,126 | 3/1962 | Brown | 106/308 Q |
| 3,383,327 | 5/1968 | Sullivan | 252/358 |
| 3,962,119 | 6/1976 | Cosentino et al. | 252/358 |

FOREIGN PATENT DOCUMENTS

| 698,179 | 11/1964 | Canada | 252/358 |
|---|---|---|---|
| 1,079,832 | 8/1967 | United Kingdom | 252/358 |

OTHER PUBLICATIONS

"Atlas HLB System, A Time Saving Guide to Emulsifier Selection", 4th Printing, May, 1971.
"General Characteristics of Atlas Surfactants," 0-7(-LG-60), 1963.

Primary Examiner—Benjamin R. Padgett
Assistant Examiner—Josephine Lloyd
Attorney, Agent, or Firm—Reynold J. Finnegan

[57] ABSTRACT

Non-aqueous antifoam compositions comprising a lipophilic nonionic surface active agent homogeneously dispersed in a transient non-aqueous siloxanate antifoam agent.

10 Claims, No Drawings

NON-AQUEOUS ANTIFOAM COMPOSITIONS

BACKGROUND OF THE INVENTION

This invention relates to novel non-aqueous antifoam compositions.

U.S. application Ser. No. 691,394, filed concurrently herewith, entitled TRANSIENT ANTIFOAM COMPOSITIONS by M. Rosen and S. Sterman discloses transient non-aqueous antifoam compositions based on silica filler and the condensation product of a partially hydrolyzed trifunctional silane. Such antifoam compositions can not be readily employed in an emulsified form due to their hydrolytic instability in water. In order to obtain a high degree of effectiveness in aqueous foam systems such antifoam compositions generally must be first solubilized using a dispersing solvent.

SUMMARY OF THE INVENTION

It has now been discovered that the above mentioned transient antifoam compositions can be made more effective in aqueous foam systems as witnessed by the novel antifoam compositions of this invention.

Thus, it is an object of this invention to provide novel improved transient non-aqueous antifoam compositions. Other objects and advantages of this invention will become readily apparent from the following description and appended claims.

More particularly this invention is directed to a non-aqueous antifoam composition consisting essentially of a lipophilic nonionic surface active agent homogeneously dispersed in a transient siloxanate antifoam agent, wherein the amount of said surface active agent to said antifoam agent ranges from about 3 to about 33 parts by weight of the surface active agent per 100 parts by weight of the antifoam agent.

It is of course to be understood that the antifoam compositions of this invention read on employing a single component of the type specified or any of the various combinations of component mixtures possible. For instance, in addition to compositions of a single type of siloxanate antifoam agent, the compositions of this invention include mixtures of nonionic surface active agents dispersed in a single siloxanate antifoam agent, a single nonionic surface active agent dispersed in mixtures of siloxanate antifoam agents as well as mixtures of nonionic surface active agents dispersed in mixtures of siloxanate antifoam agents.

DESCRIPTION OF THE PREFERRED EMBODIMENTS

The present invention is based on the discovery that non-aqueous compositions consisting essentially of a lipophilic nonionic surface active agent homogeneously dispersed in a siloxanate antifoam agent are highly effective in aqueous foam systems. The term non-aqueous as employed herein means that the antifoam compositions of this invention contain less than 1 percent by weight of water, if indeed they contain any measurable amount of water at all.

Any transient non-aqueous siloxanate antifoam agent disclosed in the above-mentioned concurrently filed U.S. applications Ser. No. 691,394 can be employed in this invention, the entire disclosure of said application being incorporated herein by reference thereto.

More particularly the transient non-aqueous antifoam agents employed in this invention are compositions consisting essentially of the product resulting from heating, in the absence of water, a mixture consisting essentially of a finely divided silica filler and a condensation product of a partially hydrolyzed trifunctional silane, said condensation product having a residual alkoxy content of at least about 9 percent by weight, said silane being selected from the group consisting of $RSiX_3$ and $RSi(OR')_3$ wherein R and R' are alkyl radicals and X is a halogen atom, and wherein the amount ratio of said silica filler to said condensation product ranges from about 1 to about 33 parts by weight of the silica filler per 100 parts by weight of the condensation product.

The finely divided silica fillers employed in the preparation of said siloxanate antifoam agents are finely powdered materials that are well known in the art such as precipitated silica, fumed silica, and the like. Such fillers preferably have an average particle diameter size of about 7 to about 25 millimicrons, preferably in the range of about 7 to about 14 millimicrons as calculated from the surface area (BET Method), assuming spericity of particles, J. Am. Chem. Soc. Vol. 60, page 309. (1938) It is to be understood that the fillers are essentially non-aqueous and that silica hydrosols are excluded from the definition of the term finely divided silica as employed herein.

The condensation products of partially hydrolyzed trifunctional silanes employed and/or methods for their preparation are well known in the art. For instance, said condensation products can be prepared by the conventional known methods of partial hydrolysis and condensation. As is well known in the art, hydrolyzates represent the metathetical reaction products of corresponding hydrolyzed silanes, while the condensation products represent the siloxanate products obtained upon condensation of the hydrolyzed reaction mixture.

The hydrolyzable trifunctional silanes used in the preparation of the condensation products employed are those silanes of the formulas $RSiX_3$ and $RSi(OR')_3$ wherein X represents a halogen atom, preferably chlorine, R represents an alkyl radical having from 1 to 5 carbon atoms and R' represents an alkyl radical having from 1 to 4 carbon atoms. Illustrative radicals represented by R include alkyl radicals such as methyl, ethyl, propyl, isopropyl, butyl, isobutyl, tertiary butyl, amyl, and the like. Most preferably R is a lower alkyl radical having from 1 to 3 carbon atoms, especially methyl. Radicals represented by R' include methyl, ethyl, propyl, butyl, isobutyl and the like. More preferably R' is methyl or ethyl, especially ethyl. Said hydrolyzable trifunctional silanes are well known in the art, illustrative examples of same include methyltrichlorosilane, methyltrimethoxysilane, methyltriethoxysilane, amyltriethoxysilane, ethyltriethoxysilane, ethyltrichlorosilane and the like.

Thus, method for obtaining the partial hydrolyzates of said hydrolyzable trifunctional silanes is not critical and any conventional method known in the art can be employed. For instance, said partial hydrolyzate can be obtained by mixing the desired silane or mixtures thereof to be partially hydrolyzed with water in the case of trialkoxysilanes or water and an alcohol in the case of trihalosilanes and refluxing the mixture until the desired degree of hydrolysis is obtained. The reaction conditions are conventional and not critical, e.g. normally the reaction temperature may range from about room temperature to reflux and the hydrolysis is generally completed within three hours. Of course it is to be understood that since partial hydrolysis is involved the amount of water employed must be less than that required for complete hydrolysis of the silane. The amount of water employed need of course only correspond to that amount required to furnish the degree of hydrolysis desired as determined by the desired degree of residual alkoxy content present in the desired condensation product. It should be also understood that in the case of trihalosilane starting materials sufficient alcohol is employed to convert in situ all the halogen radicals to alkoxy radicals, said alcohols corresponding to the residual alkoxy groups on the desired condensation product. Likewise in the case of trialkoxysilane starting materials, a catalyst, e.g. hydrochloric acid, and a solvent, e.g. an alcohol, such as ethanol can be employed if desired.

The condensation products used in the production of the siloxanate antifoam agents are obtained through the condensation of said partial hydrolyzates and can of course be recovered in any conventional manner known in the art such as by neutralization is desired, followed by stripping all the water, as well as the solvent and catalyst if employed, and any undesired by-products from the partial hydrolyzed reaction mixture. Thus, said condensation products are essentially non-aqueous siloxanate materials, the predominant species of which may be represented by the general formula

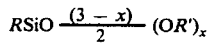

wherein R and R' are the same as defined above and wherein the value of $x$ corresponds to the residual alkoxy content of the condensation product. Said condensation products have a residual alkoxy content of at least about 9 percent by weight and more preferably from about 40 to 50 percent by weight. The preferred condensation products are those that also have a viscosity in the range from about 10 to 50 centipoises (more preferably about 10 to 20 centipoises) at 25° C. Of course it is to be understood that the condensation products encompass those co-condensation products obtained on partial cohydrolysis, if desired, of a mixture of one or more of said hydrolyzable trifunctional silanes.

As pointed out above, the transient, nonaqueous siloxanate antifoam agents are prepared by heating at an elevated temperature, a mixture consisting essentially of a finely divided silica filler and a condensation product of a partially hdyrolyzed trifunctional silane, said materials having been defined above. Typically the elevated temperature can be about 80° C. to about 200° C., preferably about 100° C. to 170° C. The period of heating is not narrowly critical and, for example, can range from at least about one-quarter hour to about 5 hours or longer if desired, with the preferred period being about one-half hour to about 3 hours. Preferably the mixture is sheared prior to the heating operation to thoroughly disperse the filler in the condensation product. If desired the mixture can be mildly agitated during the heating operation. After the heating operation the mixture need not be further processed in any way, the desired transient non-aqueous siloxanate antifoam composition normally being recovered merely by allowing the reacted mixture to cool to room temperature. However, if desired, the resulting heated mixture may be subjected to any heretofore conventional antifoam processing operation. Moreover the process employed in preparing the siloxanate antifoams is carried out in the absence of water, i.e. there is no deliberately added water and the reactants are essentially non-aqueous. The reaction mixture of filler and condensation product can be formed in any conventional manner such as by simply blending the materials together or employing a conventional high shear mixer.

While the transient non-aqueous siloxanate antifoam agents employed in this invention are preferably produced without the use of a catalyst, a catalyst can be employed if desired. When employed the catalyst may be any of the well known types heretofore employed in the preparation of antifoam compositions such as the acid catalysts disclosed in U.S. Pat. No. 3,235,509 and the basic catalysts of U.S. Pat. No 3,506,401.

The amounts of the above mentioned silica filler, condensation product and catalyst, if employed, that are mixed and heated to produce the siloxanate antifoams are not narrowly critical. Typical ranges of amounts of these materials, defined above, include from about 1 to about 33 (preferably about 3 to about 20) parts by weight of the finely divided silica filler per 100 parts by weight of the condensation product employed. Of course, if employed the amount of catalyst need only be a catalytic amount.

Of course, it is to be understood that not every siloxanate antifoam agent or antifoam composition encompassed by the instant invention will be equally effective and equally transient in their performance. For instance, antifoam compositions based on amylsilane and containing about 10 parts by weight of silica filler have been found to be very poorly transient, yet have exhibited hydrolytic instability when containing about 3 parts by weight of silica filler. The determination of optimum desired results for a given antifoam composition is well within the knowledge of one skilled in the art and can be met by routine experimentation by following the teachings of this invention.

Any lipophilic nonionic surface active agent can be employed in this invention. The nonionic surface active agent can be a nonionic organic surface active agent or more preferably a nonionic siloxane surface active agent. The term lipophilic as used herein means that the nonionic surface active agent has a hydrophilic-lipophilic balance (HLB) of less than 9. Said hydrophilic-lipophilic balance, hereinafter referred to as HLB, is a measure of the balance of the size and strength of the hydrophilic (water-loving or polar) and the lipophilic (oil-loving or non-polar) groups of a surface active agent. The HLB of a surface active agent is related to its solubility and a surface active agent having a low HLB will tend to be oil-soluble, while one having a high HLB will tend to be water-soluble. As employed herein surface active agents having an HLB number of less than 9 are lipophilic in character (i.e. tend to be oil-soluble) while surface active agents having a higher HLB number are considered to be hydrophilic in character (i.e. tend to be water-soluble). The HLB methods of determining the characteristics of a surface active agent are well known in the art and can be found more fully explained e.g. in "The Atlas HLB System a time-saving guide to emulsifier selection", 4th Printing May, 1971, published by the Atlas Chemical Industries, Inc., Wilmington, Delaware, (now known as ICI United States Inc.), the disclosure of which is encompassed herein by reference thereto. For example HLB values of most polyol fatty acid esters can be calculated with the formula $$HLB = 20\left(1 - \frac{S}{A}\right)$$

where S = saponification number of the ester (AOCS Cd 3-25) and A = acid number of the recovered acid (AOCS Cd 6-38 and AOCS L3a-57). Where the hydrophilic portion of organic surface active agents consist of ethylene oxide only the formula is simply $$HLB = E/5$$

wherein E = weight percent oxyethylene content (Morgan, P.W., "Determination of Ethers and Esters of Ethylene Glycol", Ind. and Eng. Chem., Anal. Ed., Vol. 18, page 500, 1946). While the above formulas given above are satisfactory for many non-ionic surface active agents certain other nonionic types exhibit behavior which is apparently unrelated to their composition, e.g. those containing propylene oxide, butylene oxide, nitrogen and sulfur. The HLB values of these nonionics can be experimentally estimated so that their HLB values are aligned with those of common nonionic surface active agents. While the experimentally determined HLB value will not necessarily indicate the percentage weight of its hydrophilic portion, it does indicate its apparent HLB when used in combination with other surface active agents. This experimental method of HLB determination, while not precise, briefly consists of blending the unknown surface active agent in varying ratios with a surface active agent of known HLB and using the blend to emulsify an oil of known required HLB. The blend which performs the best is assumed to have an HLB value approximately equal to the required HLB of the oil, so that the HLB value of the unknown can be calculated. A simpler and easier method for obtaining a rough estimate of HLB can be made from the water-solubility of the surface active agent. This method is especially suitable for screening nonionic siloxane surface active agents and merely involves approximating their HLB values according to their solubility or dispersibility in water as shown in the following Table:

| HLB by Dispersibility | HLB Range |
|---|---|
| No dispersibility in water | 1–4 |
| Poor dispersion | 3–6 |
| Milky dispersion after vigorous agitation | 6–8 |
| Stable milky dispersion | 8–10 |
| Translucent to clear dispersion | 10–13 |
| Clear solution | 13+ |

The determination of a HLB value for a given nonionic surface active agent generally has a precision factor of about ±1.

Of course, as pointed out above, it is to be understood that if desired mixtures of two or more nonionic surface active agents can be employed herein and that the mixtures can consist of different nonionic organic surface active agents, different nonionic siloxane surface active agents, or mixtures of nonionic organic and nonionic siloxane surface active agents. It is to be further understood that the term lipophilic nonionic surface active agent as employed herein includes not only the above types of lipophilic nonionic surface active agents and mixtures thereof, but mixtures of lipophilic nonionic surface active agents and hydrophilic nonionic surface active agents as well, so long as such mixtures are lipophilic, i.e. have a HLB value of less than 9. For example, a blend, consisting of about 67 percent by weight of a nonionic surface active agent having a HLB value of about 4.7 and about 33 percent by weight of a nonionic surface active agent having a HLB value of about 16.9, has a blended HLB value of about 8.9 and such types of mixtures are included within the scope of this invention.

Nonionic surface active agents and/or methods for their preparation which are useful in this invention are well known in the art as witnessed for example by "McCutcheon's Detergents and Emulsifiers", North America Ed. 1975 Annual, McCutcheon Division, M.C. Publishing Co., Ridgewood, N.J., the disclosure of which is incorporated herein by reference thereto. Any lipophilic nonionic organic or siloxane surface active agent, or mixtures thereof can be employed in this invention. Illustrative lipophilic nonionic organic surface active agents include polyoxyalkylene alcohols such as polyoxyethylylene (2) cetyl ether, polyoxyethylene (2) stearyl ether, polyoxyethylene (2) oleyl ether, and the like; mono and diglycerides, such as mono and diglycerides from the glycerolysis of edible fats, mono and diglycerides of fat forming fatty acids, mono and diglycerides from the glycerolysis of edible fats or oils and the like; sorbitan fatty acid esters, such as sorbitan monooleate, sorbitan partial fatty esters, sorbitan monolaurate, sorbitan monopalmitate, sorbitan monostearate, sorbitan sesquioleate, sorbitan trioleate, sorbitan tristearate, and the like; and polyoxyalkylene sorbitol esters, such as polyoxyethylene sorbitol beeswax derivative and the like, as well as any of the other known types of nonionic surface active agents that are lipophilic. The precise structural and formula configurations of such nonionic organis surface active agents is considered to be immaterial so long as the nonionic organic surface active agent is lipophilic in character as defined herein above. Illustrative commercial lipophilic nonionic organic surfactants include, e.g. certain Atmos, Atmul, Arlacel, Atpet, Span, Tween, and Brij surfactants of ICI United States Inc.

Illustrative lipophilic siloxane surface active agents include siloxane-oxyalkylene block copolymers. Such copolymers are composed essentially of siloxy units having the formula

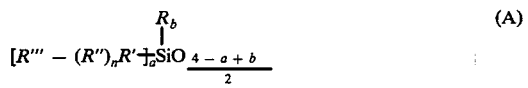   (A)

wherein R is a monovalent hydrocarbon radical, especially methyl; R' is a divalent organic group linked directly to the silicon atom; R" is an oxyalkylene group; R'" is a monovalent organic terminating group; n is an integer; a has a value of from 1 to 3 inclusive; b has a value of from 1 to 3 inclusive, and siloxy units having the formula

   (B)

wherein R is the same as defined in formula (A) above and c has a value of from 0 to 3 inclusive. Such types of siloxane-oxyalkylene block copolymers and/or methods for their preparation are well known in the art as witnessed for example, by U.S. Pat. Nos. 2,834,748; 2,917,480; 3,398,104; 3,402,192; 3,507,815; 3,741,917; and the like. The precise structural and formula configurations of such siloxane-oxyalkylene block copolymers is considered immaterial so long as the nonionic siloxane surface active agent is lipophilic in character as defined herein above. Illustrative of some of the more preferred groups represented by formula (A) and (B) above are those wherein R is a lower alkyl radical, especially methyl; wherein R' is a —$C_dH_{2d}O$— group where $d$ is an integer and the oxygen atom is linked directly to the silicon atom, or more preferably a divalent hydrocarbon group linked directly to the silicon atom through a carbon to silicon bond, e.g. propylene; wherein R" is the oxyalkylene portion or block of the siloxane-oxyalkylene block copolymer said oxyalkylene block being composed of an oxyalkylene group of the formula [—$C_dH_{2d}O$—] where $d$ is an integer, e.g. oxyethylene, oxypropylene, as well as mixtures of oxyethylene and oxypropylene, and the like. Preferably the oxyalkylene group is composed of oxyethylene or a mixture of oxyethylene and oxypropylene radicals; and wherein R'" represents an organic terminal group such as hydroxy, alkoxy, aryloxy, arylalkyloxy, alkenyloxy, acyloxy, carbamyloxy and carbonate groups the preferred terminal group being an alkoxy group of 1 to 4 carbon atoms. Illustrative of the more preferred siloxane-oxyalkylene block copolymers are those composed essentially of siloxy units of the formula $R_3SiO_{0.5}$, $R_2SiO$ and [R'"(R")$_n$R'+Si(R)O wherein R, R', R", R'" and $n$ are the same as defined above, especially those wherein R'" is an alkoxy radical.

As pointed out above mixtures of the various lipophilic nonionic surface active agents can be employed as well as mixtures of such lipophilic agents and hydrophilic nonionic surface active agents so long as the mixture is lipophilic in character as herein defined above. Such hydrophilic nonionic surface active agents that may be employed are well known in the art. Illustrative hydrophilic surface active agents include those of the same surface active agent classes as defined above having an HLB of more than 9, as well as the conventional polyoxyalkylene compounds, e.g. the Myrj surfactants of ICI United States Inc., The Tergitol surfactants of Union Carbide Corporation, and the like.

The non-aqueous antifoam compositions of this invention are prepared by homogeneously dispersing a lipophilic nonionic surface active agent in a transient non-aqueous siloxanate antifoam agent. The term homogeneously dispersed as employed herein means that the nonaqueous antifoam compositions of this invention are either homogeneous solutions as in the case wherein the lipophilic nonionic surface active agent is soluble in the siloxanate antifoam agent or homogeneous dispersions wherein the lipophilic nonionic surface active agent is completely distributed throughout the composition as in the case wherein the lipophilic nonionic surface active agent is not soluble in the siloxanate antifoam agent. Thus, the two components need only be throughly blended or mixed in any conventional known manner for obtaining homogeneous dispersions. In the case where lipophilic nonionic surface active agent is not soluble in the siloxanate antifoam agent the surface active agent is preferably throughly mixed with the antifoam agent at a temperature sufficient to liquify the nonionic surface active agent if it is a solid until a homogeneous dispersion is obtained. Alternatively, if its a non-soluble solid, the lipophilic nonionic surface active agent can be preheated to its melting point and then thoroughly mixed with the siloxanate antifoam agent, at a temperature sufficient to maintain the nonionic surface active agent as a liquid, until a homogeneous dispersion is obtained. It should be noted that particular attention should be applied to the amount of work (shear-time) expended to optimize the homogeneous dispersions of this invention. If too little work is put in surface active agent separation may occur with time, while if too much work is put in the performance of the base antifoam may degrade. The preferred intermediate work range in obtaining the optimized, most stable antifoam compositions of this invention will vary depending upon the particular surface active agent and antifoam components employed, however, the preferred limits can be easily determined by routine experimentation.

As pointed out above the amount ratio of lipophilic nonionic surface active agent to siloxanate antifoam agent can range from about 3 to about 33 parts by weight of the surface active agent per 100 parts by weight of the antifoam agent. More preferably said amount ratio ranges from about 5 to about 25 parts by weight of the surface active agent per 100 parts by weight of the antifoam agent. In general the preferred surface active agents employed herein are the lipophilic nonionic siloxane surface active agents.

Of course, it is to be understood that not every possible lipophilic nonionic surface active agent will be optimally suited for every possible siloxanate antifom agent and that the antifoam activity of the non-aqueous antifoam compositions of this invention will vary depending upon the ingredients employed. For example the compatibility of the surface active agent/antifoam mixture as evidenced by resistance to gross phase separation on standing or poor homogenity resulting in a lumpy appearance as well as the nature of the aqueous foaming media to which the antifoam is to be applied will play a role in the proper choice of surface active agent and concentration in terms of gaining suitable antifoam peformance. However, the determination of optimum desired results is well within the knowledge of one skilled in the art and can be met by routine experimentation involving the proper selection of surface active agent, concentration and well known process techniques for preparing stable dispersions.

The transient non-aqueous antifoam compositions of this invention can be employed to prevent or destroy the foam formation of an aqueous or non-aqueous foam forming media. Thus, the compositions of this invention are useful in many applications wherein foaming is not desired, such as in the preparation and use of aqueous media systems, e.g. shampoos, waste-water treatment, fermentation processing, paper making, paints, latex systems, cleaning compounds, laundry and detergent products and the like. Moreover, because of the antifoam compositions of this invention are based on transient antifoam agents, they can be especially useful in applications where short term foaming control is desired such as in waste-water treatment and in the processing and packaging of foam liquids such as shampoos, liquid cleaners and the like, and possibly even in the processing and packaging of beverages, such as beer. Moreover preferred antifoam compositions of this invention containing nonionic siloxane surface active agents having a HLB value of less than 9 have been found to exhibit good stability upon storage both at room temperature and at elevated temperature (about 50° C) Of course the utility in a specific area will depend upon the foaming media system to which the antifoam is to be applied and the resultant antifoam activity desired for said system.

The following examples are illustrative of the present invention and are not to be regarded as limitative. It is to be understood that all parts percentages and proportions referred to herein and in the claims are by weight unless otherwise indicated and that Me represents a methyl radical ($-CH_3$).

As set forth herein below and in the Examples, the following abbreviations are used.

| Surfactant | Nonionic Surface Active Agents Composition | HLB+ Number |
|---|---|---|
| A | *Brij 52 (polyoxyethylene (2) cetylether) | 5.3 |
| B | *Brij 72 (Polyoxyethylene (2) stearylether) | 4.9 |
| C | *Brij 93 (Polyoxyethylene (2) oleylether) | 4.9 |
| D | *Arlacel 20 (Sorbitan monolaurate) | 8.6 |
| E | *Span 40 (Sorbitan monopalmite) | 6.7 |
| F | *Span 60 (Sorbitan monostearate) | 4.7 |
| G | *Arlacel 60 (Sorbitan monostearate) | 4.7 |
| H | *Span 65 (Sorbitan tristearate) | 2.1 |
| I | *Arlacel 83 (Sorbitan sesquioleate) | 3.7 |
| J | *Atmul 124 (Mono and diglycerides from the glycerolysis of edible fats) | 3.5 |
| K | *Arlacel 80 (Sorbitan monooleate) | 4.3 |
| L | *Span 80 (Sorbitan monooleate) | 4.3 |
| M | *Arlacel 85 (Sorbitan trioleate) | 1.8 |
| N | About a 67:33% by wt. mixture of Arlacel 20 and Span 60 | 7.4 |
| O | About a 50:50% by weight mixture of Arlacel 20 and Span 60 | 6.7 |
| P | About a 33:67% by wt. mixture of Arlacel 20 and Span 60 | 5.9 |
| Q | Arlacel 165 (Glycerol monostearate) | 11.0 |
| R | Brij 30 (Polyoxyethylene (4) lauryl ether) | 9.7 |
| S | *Myrj 52 (Polyoxyethylene (4) stearate) | 16.9 |
| T | *Tween 61 (Polyoxyethylene (4) sorbitan monostearate | 9.6 |
| U | **Tergitol 15S12 (Ethoxylated $C_{11}-C_{15}$ alcohols-12 moles ethylene oxide) | 15.0 |
| V | **Tergitol 15S.9 (Ethoxylated $C_{11}-C_{15}$ alcohols-9 moles ethylene oxide) | 13.8 |
| W | **Tergitol 15S7 (Ethoxylated $C_{11}-C_{15}$ alcohols-7 moles ethylene oxide) | 12.8 |
| X | **Tergitol 15S5 (Ethoxylated $C_{11}-C_{15}$ alcohols-5 moles ethylene oxide) | 11.3 |
| Y | **Tergitol 15S3 (Ethoxylated $C_{11}-C_{15}$ alcohols-3 moles ethylene oxide | 9.0 |
| Z | About a 67:33% by weight mixture of Span 60 and Myrj 52 | 8.7 |
| AA | About a 67:33% by wt. mixture of Tergitol 15S3 and Tergitol 15S7 | 10.2 |
| BB | About a 50:50% by wt. mixture of Tergitol 15S3 and Tergitol 15S7 | 10.9 |
| CC | About a 33:67% by wt. mixture of Tergitol 15S3 and Tergitol 15S7 | 11.5 |
| DD | $Me_3SiO(Me_2SiO)_{37}(MeSiO)_3SiMe_3$ with pendant $C_3H_6(OC_2H_4)_7OCH_3$ | 6–8*** |
| EE | $Me_2SiO(Me_2SiO)_{188}(MeSiO)_{12}SiMe_2$ with pendant $C_3H_6(OC_2H_4)_7OCH_3$ | 6–8*** |
| FF | $Me_3SiO(Me_2SiO)_{20}(MeSiO)_{3.2}SiMe_3$ with pendant $C_3H_6(OC_2H_4)_7OCH_3$ | 6–8*** |
| GG | $Me_3SiO(Me_2SiO)_{164}(MeSiO)_{36}SiMe_3$ with pendant $C_3H_6(OC_2H_4)_7OCH_3$ | 6–8*** |
| HH | $Me_3SiO(Me_2SiO)_{75}(MeSiO)_9SiMe_3$ with pendant $C_3H_6(OC_2H_4)_{17}OCH_3$ | 6–8*** |
| II | $MeSi[O-(Me_2SiO)_{6.5}(C_2H_4O)_{22}(C_3H_6O)_{17}C_4H_9]_3$ | 10–13*** |

-continued

Nonionic Surface Active Agents

| Surfactant | Composition | HLB+ Number |
|---|---|---|
| JJ | $Me_2SiO(Me_2SiO)_{20}(MeSiO)_{3.2}SiMe_2$<br>            \|<br>$C_3H_6(OC_2H_4)_{19}(OC_3H_6)_{14}OC_4H_9$ | 10-13*** |
| KK | $Me_3SiO(Me_2SiO)_{72}(MeSiO)_{5.1}SiMe_3$<br>            \|<br>$C_3H_6O(C_2H_4O)_{20}(C_3H_6O)_{29}C_3H_7$ | 10-13*** |
| LL | $Me_3SiO(Me_2SiO)SiMe_3$<br>            \|<br>$C_3H_6OCH_2CHOHCH_2N^+Me_3Cl^-$ | 10-13*** |
| MM | $Me_3SiO(Me_2SiO)_5(MeSiO)_7SiMe_3$<br>            \|<br>$C_3H_6(OC_2H_4)_7OCH_3$ | 10-13*** |
| NN | $Me_3SiO(Me_2SiO)_{40}(MeSiO)_7SiMe_3$<br>            \|<br>$C_3H_6(OC_2H_4)_7OCH_3$ | 10-13*** |
| OO | $Me_3SiO(Me_2SiO)_{40}(MeSiO)_{40}SiMe_3$<br>            \|<br>$C_{18}H_{37}$ | 10-13*** |
| PP | $Me_3SiO(Me_2SiO)_{50}(MeSiO)_5SiMe_3$<br>            \|<br>$C_3H_6(OC_2H_4)_{16}OCH_3$ | 10-13*** |
| QQ | About a 67:33% by wt. mixture of Tergitol 15S7 and<br>$Me_3SiO(Me_2SiO)_{20}(MeSiO)_{3.2}SiMe_3$<br>            \|<br>$C_3H_6(OC_2H_4)_{19}(OC_3H_6)_{14}OC_4H_9$ | 10-13*** |

+Hydrophilic-lipophilic balance number.
*Product of ICI United States Inc.
**Product of Union Carbide Corporation
***HLB determined by the surfactant's dispersibility in water.

MECHANICAL SHAKING TEST (TEST II)

About 0.05 grams of the antifoam (1000 ppm) to be tested was placed in an 8 oz. wide mouth jar to which was added about 50 grams of aqueous Green Soap (Eli Lilly and Company) solution (about 0.5% by wt.) The jar was then covered and shaken on a wrist action shaker for two minutes. The jar was held to the shaker by a three-prong clamp which is 25 cm. away from the central shaking bar (measured from the center of the jar). The angle of shaking was set at 10 (the maximum). After the two minute shaking period the jar was removed and one minute later the height of empty space (cm. of foam breakdown) was measured. If no foam was present, the cm. of foam breakdown was at the maximum value of 7.3 cm. If the jar was full of foam (which happened when just the Green Soap solution was employed), the cm. of foam breakdown is 0. The results are reported in terms of percent foam breakdown. For example, if there is 5 cm. of foam breakdown then the Percent Foam Breakdown = $(5/7.3) \times 100 = 69\%$ The control was run with 50 grams of said 0.5% aqueous Green Soap solution which gives 0% foam breakdown. The transient behavior of the antifoam composition was recorded by repeating the test on the same test mixtures after a few days upon standing and oberving the change in antifoaming activity with time.

TEST PROCEDURES

In the Examples appearing below the following test procedures were used to determine the effectiveness of the antifoams.

Bubbling Test (Test I)

About 0.1 gram of the antifoam tested was added to about 250 grams of a freshly prepared homogeneous 0.5 percent by weight aqueous Green Soap (Eli Lilly and Company) solution in a stoppered graduate. The graduate was gently inverted several times until the antifoam was dispersed in the soap solution. About 100 grams of the liquid mixture (antifoam and soap solution) was then added to a 1000 cc. graduate. A nitrogen bubbler containing a porous glass frit was then inserted in the graduate and nitrogen bubbled into the liquid mixture at a flow rate equal to the flow rate that produced 1000 cc. of foam (foam and liquid) in two minutes from 100 grams of said soap solution in the absence of any antifoam agent. The foam volume produced by each liquid mixture (antifoam and soap solution) is then recorded by reading the height of the foam in the graduate at five and ten minute intervals. The dispersibility and antifoaming activity of the antifoam tested is indicated by the recorded volume of foam so produced, the lower the foam volume the more dispersed and effective the antifoam. The volume of foam generated after five minutes has a reproducability of about ± 20 cc, while the foam volume generated after ten minutes has a reproducability of about ± 50 cc.

ANTIFOAM ACTIVITY IN COMMERCIAL FOAMING LIQUID (TEST III)

The commercial foaming liquid was diluted to a 50 percent aqueous solution with distilled water and 250 cc. of said solution added to about 0.1 gram of the antifoam (400 ppm) composition to be tested. After shaking to disperse the antifoam, 125 cc. of said solution-antifoam dispersion was placed in an 8 oz. wide mouth jar, which was covered and shaken ten times (one shake equaling one up and down motion). The antifoam effectiveness was then rated as follows:

| Rating | Qualitative Observation |
|---|---|
| Complete | No foam visible |
| Good | No foam in center but foam visible at the walls |
| Moderate | Thin foam layer covers the liquid surface |
| Slight | Foam layer over liquid surface |
| None | Foam fills available head space-no evidence of any breakdown. |

EXAMPLE 1

A condensation product of a partially hydrolyzed silane was prepared on a plant scale as follows. About 19750 lbs. of methyltrichlorosilane, MeSiCl$_3$, along with about 7300 lbs. of anhydrous ethanol was feed to a reaction kettle. After about 4000 lbs. of the silane had been added, about 1700 lbs. of water was simultaneously added to the kettle along with the rest of the silane and ethanol. After adding said reactants the reaction mixture was cooled to 70° C. and refluxed for 2½ hours. The mixture was then cooled to about 83° to 86° C. and all its volatiles i.e. alcohol, acid catalyst, and water, removed by vacuum stripping at two pounds pressure. As the stripping rate fell the vacuum pressure was increased to just less than about 100 mm. pressure. The stripping was carried out over 2 hours at 135° C. The stripped mixture was then cooled to 100° C. and activated carbon used to remove the color. The mixture was then neutralized with propylene oxide until the chlorine content was less than 0.01 percent followed by vacuum stripping to remove said propylene oxide. The desired condensation product so recovered was a siloxanate which may be considered as having the general formula

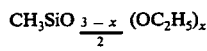

$$CH_3SiO_{\frac{3-x}{2}}(OC_2H_5)_x$$

Analysis of said desired condensation product showed it to have a viscosity of about 17 centipoises at 25° C. and contain about 47.1 percent by weight of residual ethoxy groups.

EXAMPLE 2

A series of ten gram samples of non-aqueous antifoam compositions were prepared, each composition consisting of about 2 gram of surface active agent used homogeneously blended in about 8 grams of a transient non-aqueous siloxanate antifoam agent, said antifoam agent consisting essentially of the product resulting from stirring about one gram of finely divided fumed silica filler into about ten grams of the condensation product of Example 1 until the mixture was homogeneous subjecting the mixture to high shear by passing it through an orifice and then heating it for about two hours at about 150° C. In those cases where a single surface active agent was used the compositions were prepared by merely throughly mixing the surface active agent and siloxanate antifoam at room temperature with a spatula for about 1 to 2 minutes until the surface active agent was uniformly distributed throughout the antifoam. In those cases where a mixture of two surface active agents were used, the surface active agents were first blended together in the proper ratio (i.e. 2 grams/4 grams for a 1:2 ratio, 4 grams/4grams for a 1:1 ratio and 4 grams/2 grams for a 2:1 ratio) and then heated to make a homogeneous mixture. The proper amount of surface active agent mixture was then added to the siloxanate antifoam agent and the mixture heated and stirred until the surface active agents melted and were uniformly distributed throughout the antifoam. The non-aqueous antifoam compositions so prepared are listed below along with the identified surface active agent present in each composition.

| Non-Aqueous Antifoam Compositions | Surface Active Agent |
|---|---|
| I | D |
| II | F |
| III | N |
| IV | O |
| V | P |
| VI | S |
| VII | W |
| VIII | X |
| IX | Y |
| X | Z |
| XI | AA |
| XII | BB |
| XIII | CC |
| XIV | II |
| XV | JJ |
| XVI | NN |
| XVII | QQ |

EXAMPLE 3

A series of ten gram samples of non-aqueous antifoam compositions were prepared by repeating the procedure of Example 2 except that in this instance each prepared composition consisted of about 1 gram of surface active agent homogeneously blended in about 9 grams of the same siloxanate antifoam agent defined in Example 2. The non-aqueous antifoam compositions so prepared are listed below along with the identified surface active agent present in each composition.

| Non-Aqueous Antifoam Compositions | Surface Active Agent |
|---|---|
| XVIII | A |
| XVIX | B |
| XX | C |
| XXI | D |
| XXII | E |
| XXIII | F |
| XXIV | G |
| XXV | H |
| XXVI | I |
| XXVII | K |
| XXVIII | L |
| XXIX | M |
| XXX | O |
| XXXI | J |
| XXXII | Q |
| XXXIII | R |
| XXXIV | T |
| XXXV | W |
| XXXVI | X |
| XXXVII | Y |
| XXXVIII | DD |
| XXXIX | EE |
| XL | FF |
| XLI | GG |
| XLII | HH |
| XLIII | JJ |
| XLIV | KK |
| XLV | LL |
| XLVI | MM |
| XLVII | NN |
| XLVIII | OO |

| Non-Aqueous Antifoam Compositions | Surface Active Agent |
|---|---|
| XLIX | PP |

EXAMPLE 4

A series of ten gram samples of non-aqueous antifoam compositions were prepared by repeating the procedure of Example 2 except that in this instance each prepared composition consisted of about 0.5 grams of surface active agent homogeneously blended in about 9.5 grams of the same siloxanate antifoam agent defined in Example 2. The non-aqueous antifoam compositions so prepared are listed below along with the identified surface active agent present in each composition.

| Non-Aqueous Antifoam Compositions | Surface Active Agent |
|---|---|
| L | B |
| LI | C |
| LII | F |
| LIII | J |
| LIV | Q |
| LV | S |
| LVI | U |
| LVII | V |
| LVIII | W |
| LIX | X |
| LX | Y |
| LXI | AA |
| LXII | DD |
| LXIII | EE |
| LXIV | FF |
| LXV | II |
| LXVI | JJ |
| LXVII | NN |
| LXVIII | QQ |

EXAMPLE 5

A series of 10 gram samples of non-aqueous antifoam compositions were prepared by repeating the procedure of Example 2 except that in this instance each prepared composition consisted of about 0.1 gram of surface active agent homogeneously blended in about 9.9 grams of the same siloxanate antifoam agent defined in Example 2. The non-aqueous antifoam compositions so prepared are listed below along with the identified surface active agent present in each composition.

| Non-Aqueous Antifoam Composition | Surface Active Agent |
|---|---|
| LVXIX | DD |
| LVXX | EE |
| LVXXI | FF |

EXAMPLES 6–22

The 80 percent active antifoam compositions produced in Example 2 above were tested according to the Bubbling Test (Test I) defined above and the results of said tests are given below in TABLE 1.

TABLE 1

| Ex. No. | Antifoam Composition | Foam Volume (cc) After 5 Minutes | Foam Volume (cc) After 10 Minutes |
|---|---|---|---|
| 6 | I | 440 | 580 |
| 7 | II$^b$ | 427* | 570* |
| 8 | III | 450 | 590 |
| 9 | IV | 525 | 690 |
| 10 | V | 490 | 640 |
| 11 | VI$^c$ | 510 | 720 |
| 12 | VII$^d$ | 540 | 750 |
| 13 | VIII$^a$ | 490 | 700 |
| 14 | IX$^a$ | 500 | 660 |
| 15 | X$^c$ | 520 | 670 |
| 16 | XI$^a$ | 450 | 640 |
| 17 | XII | 490 | 690 |
| 18 | XIII | 560 | 770 |
| 19 | XIV$^d$ | 465 | 650 |
| 20 | XV$^d$ | 510 | 720 |
| 21 | XVI$^d$ | 510 | 720 |
| 22 | XVII$^d$ | 450 | 620 |

*Average results of three runs.
$^a$Low viscosity-some filler separation on bottom.
$^b$Viscous-lumpy
$^c$Viscous paste
$^d$Gross separation The above results demonstrate that all 80% active antifoam compositions (I to III), save for IV, V and X, containing a nonionic surface active agent having a HLB value of less than 9 were very effective in improving the antifoam properties of the neat siloxanate antifoam agent, while all the antifoam compositions VI to IX and XI to XVII containing a nonionic surface active agent having a HLB value of 9 or above were not as effective.

EXAMPLES 18 TO 51

The 90 percent active non-aqueous antifoam compositions produced in Example 3 above were tested according to the Bubbling Test (Test I) defined above and the results of said tests are given below in TABLE 2.

For comparison two control antifoams were also tested.

Control antifoam YY consisted of the neat transient non-aqueous siloxanate antifoam agent defined in Example 2, i.e. free of any additives. The same Bubbling Test (Test I) defined above was repeated using about 0.1 grams of said antifoam YY and about 250 grams of the same soap solution.

Control antifoam ZZ consisted of about 2 grams of control antifoam YY dispersed in about 98 grams of Dimethyl Cellosolve, a dispersing solvent. The same Bubbling Test (Test I) was repeated using about 2 grams of said antifoam ZZ and about 98 grams of the same soap solution.

The results of said comparison tests are also given in TABLE 2 below.

TABLE 2

| Ex. No. | Antifoam Compositions | Foam Volume (cc) After 5 Minutes | Foam Volume (cc) After 10 Minutes |
|---|---|---|---|
| 18 | XVIII | 410 | 580 |
| 19 | XIX$^c$ | 440 | 570 |
| 20 | XX$^a$ | 450 | 590 |
| 21 | XXI$^d$ | 435 | 570 |
| 22 | XXII$^a$ | 450 | 600 |
| 23 | XXIII$^e$ | 435* | 562* |
| 24 | XXIV$^e$ | 450 | 590 |
| 25 | XXV$^e$ | 450 | 590 |
| 26 | XXVI$^d$ | 400 | 580 |
| 27 | XXVII$^d$ | 430** | 550** |
| 28 | XXVIII$^d$ | 520 | 660 |
| 29 | XXIX$^d$ | 433** | 547** |
| 30 | XXX | 485 | 640 |
| 31 | XXXI$^f$ | 420 | 550 |
| 32 | XXXII$^f$ | 460 | 590 |
| 33 | XXXIII | 490 | 700 |
| 34 | XXXIV$^f$ | 480 | 680 |
| 35 | XXXV$^d$ | 515 | 750 |
| 36 | XXXVI$^a$ | 470 | 630 |
| 37 | XXXVII$^a$ | 453 | 610 |

TABLE 2-continued

| Ex. No. | Antifoam Compositions | Foam Volume (cc) After 5 Minutes | Foam Volume (cc) After 10 Minutes |
|---|---|---|---|
| 38 | XXXVIII | 425 | 500 |
| 39 | XXXIX | 420 | 520 |
| 40 | XL | 380 | 520 |
| 41 | XLI | 470 | 700 |
| 42 | XLII | 410 | 620 |
| 43 | XLIII | 500 | 800 |
| 44 | XLIV | 515 | Separated *** |
| 45 | XLV | 620 | Separated *** |
| 46 | XLVI | 650 | Separated *** |
| 47 | XLVII | 630 | 900 |
| 48 | XLVIII[d] | 520 | 780 |
| 49 | XLIX[a] | 450 | 700 |
| 50 | Control YY | 755 | Separated*** |
| 51 | Control ZZ | 420 | 500 |

*Average results of five runs.
**Average results of three runs.
***Foam column broke.
[a]Low viscosity, some filler separation on bottom.
[b]Slight non-homogenity
[c]Viscous, lumpy
[d]Gross separation
[e]Slightly viscous
[f]Viscous paste The above results demonstrate that all 90% active antifoam compositions (XVIII to XXVII, XXIX, XXXI and XXXVIII to XL) save for XXVIII, XXX, XLI and XLII, containing a nonionic surface active agent having a HLB value of less than 9 were very effective in improving the antifoam properties of the neat siloxanate antifoam agent, while all antifoam compositions (XXXII to XXXVII and XLIII to XLIX), save for XXXII, containing a nonionic surface active agent having a HLB value of 9 or more were not as effective. Note that antifoam compositions XLI and XLII were in general more effective than antifoam compositions XLIV to XLIX. The effectiveness of antifoam composition XXXII may be due to the fact that the nonionic surface active agent is self-emulsifying. Note also that the performance of antifoams XXXVIII to XL is similar to that of control antifoam composition ZZ which employs a dispersing solvent.

EXAMPLES 52 to 70

The 95 percent active non-aqueous antifoam compositions produced in Example 4 above were tested according to the Bubbling Test (Test I) defined above and the results of said tests are given below in TABLE 3.

TABLE 3

| Ex No. | Antifoam Composition | Foam Volume (cc) After 5 Minutes | Foam Volume (cc) After 10 Minutes |
|---|---|---|---|
| 52 | L | 610 | Separated* |
| 53 | LI[a] | 740 | Separated* |
| 54 | LII | 460 | 610 |
| 55 | LIII[b] | 420 | 560 |
| 56 | LIV[c] | 480 | 650 |
| 57 | LV[f] | 580 | Separated* |
| 58 | LVI[a] | 550 | 790 |
| 59 | LVII[a] | 540 | 750 |
| 60 | LVIII[d] | 490 | 720 |
| 61 | LIX[a] | 500 | 700 |
| 62 | LX[a] | 480 | 620 |
| 63 | LXI[a] | 500 | 740 |
| 64 | LXII | 430 | 540 |
| 65 | LXIII | 435 | 550 |
| 66 | LXIV | 375 | 520 |
| 67 | LXV[d] | 470 | 650 |
| 68 | LXVI[d] | 500 | 690 |
| 69 | LXVII[d] | 630 | Separated* |
| 70 | LXVIII[d] | 490 | 700 |

*Foam column broke
[a]Low viscosity, some filler separation on bottom
[b]Slight non-homogenity
[c]Viscous, lumpy
[d]Gross separation The above results based on 95% active antifoam compositions demonstrate that while antifoam composition LIII was the only composition containing a nonionic organic surface active agent having a HLB value of less than 9 that was very effective in improving the antifoam properties of the neat siloxane antifoam agent, all the antifoam compositions (LXII to LXIV) containing a nonionic siloxane surface active agent having a HLB number of less than 9 were very effective in improving the antifoam properties of the neat siloxanate antifoam agent. Moreover all antifoam compositions (LIV to LXI and LXV to LXVIII) containing a nonionic organic or siloxane surface active agent having a HLB value of 9 or above were not as effective.

EXAMPLES 71-73

The 99 percent active non-aqueous antifoam compositions produced in Example 5 above were tested according to the Bubbling Test (Test I) defined above and the results of said tests are given below in TABLE 4.

TABLE 4

| Ex. No | Antifoam Composition | Foam Volume (cc) After 5 Minutes | Foam Volume (cc) After 10 Minutes |
|---|---|---|---|
| 71 | LXIX | 545 | 850 |
| 72 | LXX | 790 | Separated* |
| 73 | LXXI | 500 | 800 |

*Foam column broke

The above results demonstrate that antifoam compositions containing only about 1 percent by weight of a nonionic siloxane surface active agent having an HLB value of less than 9 were not very effective in improving the antifoam properties of the neat siloxanate antifoam agent.

EXAMPLE 74

Non-aqueous antifoam composition XVIII (as described in Example 3) was freshly prepared and tested for its activity according to the Bubbling Test (Test I) defined above. Said antifoam composition had a Brookfield viscosity (#1 Spindle, 6RPM) of about 161 centipoises at about 25° C. The test was then repeated on the same antifoam soap solution after it has been aged for various periods of time at room temperature. The results were as follows:

| Period of Aging | Foam Volume (cc) After 5 Minutes |
|---|---|
| Fresh | 390 |
| 1 Hour | 415 |
| 3 Days | 470 |
| 5 Days | 800 |

The above results demonstate the transient nature of antifoam composition XVIII.

EXAMPLE 75

Non-aqueous antifoam composition LXIII (as described in Example 4) was freshly prepared and tested for its activity according to the Bubbling Test (Test I) defined above. Said antifoam composition had a Brookfield viscosity (#1 Spindle, 6RPM) of about 142 centipoises at about 25° C. The test was then repeated on the same antifoam-soap solution after it had been aged for various periods of time at room temperature. The results were as follows.

| Period of Aging | Foam Volume (cc) After 5 Minutes |
|---|---|
| Fresh | 420 |
| 1 Hour | 510 |
| 1 Day | No activity at all |

The above results demonstrate the transient nature of antifoam composition LXIII.

EXAMPLE 76

Non-aqueous antifoams XVIII (Example 3) and LXIII (Example 4) were tested for their activity on a variety of commercial foaming liquids according to Test III defined above. The results of said tests are given in TABLE 5 below.

mercial foaming liquids and their subsequent hydrolytic instability (transience).

EXAMPLE 77

This example demonstrates the stability of the non-aqueous antifoam compositions of this invention to room temperature aging. Antifoam compositions II, XVIII, XX, XXII, XXIII, XXIV, XXV, LII and LIII were stored at room temperature for various time periods and tested for effectiveness at the end of said time periods according to the Bubbling Test (Test I) defined above. The results of said tests are given in Table 6 below.

TABLE 5

| | | | | Antifoam XVIII | | Antifoam LXIII | |
|---|---|---|---|---|---|---|---|
| Type | Foaming Liquid | pH | Control No Antifoam | Fresh | Time Till No Antifoam Activity Hours | Fresh | Time Till No Anti-Foam Activity Hours |
| Shampoo | | | | | | | |
| *Earthborn | | 3.9 | N | G | 24 | G | 24 |
| **Breck Dry | | 7.9 | N | G | 72 | G | 144 |
| **Breck Oily | | 8.2 | N | G | 48 | G | 144 |
| Dish Detergents | | | | | | | |
| *** Joy | | 6.9 | N | C | 144 | C | 144 |
| +Palmolive | | 7.2 | N | C | 96 | G | M at 144 |
| Liquid Laundry Detergents | | | | | | | |
| +Dynamo | | 8.8 | N | C | 48 | G | 48 |
| ***Era | | 7.7 | N | G | 48 | G | 48 |
| Liquid Hard Surface Cleaners | | | | | | | |
| ++ Chlorox 409 | | 12.0 | N | C | 96 | C | M at 144 |

*Product of Gillette Co.
**Product of American Cyanamid Co.
***Product of Proctor and Gamble Co.
⁺Product of Colgate Palmolive Co.
⁺⁺Product of Chlorox Co.
Antifoam Activity: C = Complete
G = Good
M = Moderate
S = Slight
N = None
Note qualitative description given in Test III, defined above.

The above results demonstrate the initial effectiveness of antifoam compositions XVIII and LXIII in com-

TABLE 6

| Non-Aqueous Antifoam Compositions | Days Aged at Room Temperature | Foam Volume (cc) After 5 Minutes | Foam Volume (cc) After 10 Minutes |
|---|---|---|---|
| II⁺⁺⁺ | 0 | 430 | 570 |
| " | 11 | 480 | 620 |
| " | 18 | 490 | 670 |
| " | 43 | 455 | 600 |
| XVIII⁺ | 0 | 410 | 580 |
| " | 24 | 400* | 560* |
| " | 60 | 450 | 600 |
| XX⁺ | 0 | 450 | 590 |
| " | 30 | 370 | 520 |
| XXLL³⁰ | 0 | 450 | 600 |
| " | 24 | 470* | 610* |
| XXIII⁺ | 0 | 435 | 590 |
| " | 5 | 430* | 578* |
| " | 12 | 460* | 610* |
| " | 35 | 400 | 510 |
| " | 36 | 452* | 600* |
| XXIV⁺ | 0 | 450 | 590 |
| " | 24 | 440 | 590 |
| XXV⁺ | 0 | 450 | 590 |
| " | 30 | 400 | 530 |
| LII⁺⁺ | 0 | 460 | 610 |
| " | 11 | 500 | 660 |
| " | 43 | 460 | 640 |
| LIII⁺⁺ | 0 | 420 | 560 |
| " | 11 | 565* | 750* |

³⁰Same as described in Example 3
⁺⁺Same as described in Example 4
⁺⁺ Same as described in Example 2
*Average results of two runs.

EXAMPLES 78–84

Antifoam compositions XVIII, XX, XXIII, XXIV and XXV were prepared on a larger scale (200 gram preparations) using the same ingredients and ratio of ingredients and compared with larger scale preparations of control antifoam compositions YY and ZZ.

Thus, about a 120 pound preparation of control antifoam composition YY was prepared by mixing and shearing about 12 pounds of finely divided fumed silica filler with about 108 pounds of condensation product of Example 1 which was then heated for about two hours at about 150° C.

The 200 gram preparation of antifoam compositions XVIII, XX, XXIII, XXIV and XXV consisted of about 20 grams of Surfactants A, C, F, G, and H respectively, homogeneously blended at about 70° C with about 180 grams of said large scale preparation of antifoam composition YY. Control antifoam composition ZZ consisted of about a 2 weight percent solution of said large scale preparation of antifoam composition YY in Dimethyl Cellosolve (i.e. about 2 grams of antifoam YY in about 98 grams of Dimethyl Cellosolve).

The large scale antifoam compositions so produced were then tested for effectiveness according to the Bubbling Test (Test I) defined above, using about 0.1 gram of antifoam compositions XVIII, XX, XXIII, XXIV, XXV and YY respectively to about 250 grams of the soap solution and about 2 grams of antifoam composition ZZ to about 98 grams of the same soap solution. The results of said tests are given below in TABLE 7.

TABLE 7

| Ex. No. | Antifoam Compositions | Foam Volume After 5 Minutes | Foam Volum (cc) After 10 Minutes |
|---|---|---|---|
| 78 | XVIII | 775* | Separated** |
| 79 | XX | 445* | 585* |
| 80 | XXIII | 400* | 575* |
| 81 | XXIV | 420 | 530 |
| 82 | XXV | 440 | 590 |
| 83 | YY | 775+ | Separated** |
| 84 | ZZ | 424++ | 498++ |

*Average results of two runs.
**Foam column broke
++Average results of nine runs (Standard deviation after 5 minutes about 26 and after 10 minutes about 45).

The data in Table 7 on the larger scale preparations in general demonstrates good agreement with the small scale preparation data in Table 1. The large scale preparation of antifoam composition XVIII for some unknown reason did not work as well compared to its small scale preparation, however, upon retesting two months later antifoam composition XVIII showed excellent performance.

EXAMPLE 85

This Example demonstrates the heat stability of the non-aqueous antifoam compositions of this invention upon aging at 50° C. Antifoam compositions XX, XXIII, XXIV, and XXV were stored at 50° C. for various time periods and tested for effectiveness at the end of said time periods according to the Bubbling Test (Test I) defined above. The results of said tests are given in Table 8 below.

TABLE 8

| Non-Aqueous Anti-foam Compositons+ | Weeks Stored at 50° C. | Foam Volume (cc) After 5 Minutes | Foam Volume (cc) After 10 Minutes |
|---|---|---|---|
| XX | 1** | 490* | 695* |
| XXIII | 1 | Precipitate | Formed |
| XXIV | After 2 days at 50° C. a | | precipitate formed |
| XXV | 1** | 510 | 670 |
| Control YY | 1 | 400 | 460 |

+Same as described in Examples 78-84 and freshly prepared
*Average results of two runs
**Antifoam degrades

EXAMPLE 86

This Example demonstrates the stability of the non-aqueous antifoam compositions of this invention upon cooling to 0° C. and then rewarming to room temperature. Antifoam compositions XVIII XX, XXIII, and XXV were cooled to 0° C. and tested for effectiveness upon being rewarmed to room temperature according to the Bubbling Test (Test I) defined above. In some instances the antifoam composition went through two cooling and rewarming cycles. The results of said test are given in Table 9 below.

TABLE 9

| Non-Aqueous Antifoam Composition+ | Cooling/Rewarming No. Cycles | Foam Volume (cc) After 5 Minutes | Foam Volume (cc) After 10 Minutes |
|---|---|---|---|
| XVIII | 1 | 750 | Separated* |
| " | 2 | 790 | Separated* |
| XX | 1 | 430 | 590 |
| " | 2 | 440 | 590 |
| XXIII | 1 | 430 | 590 |
| " | 2 | 420 | 570 |
| XXV | 1 | 450 | 590 |
| " | 2 | 460 | 600 |

+Same as described in Exampls 78-84 and freshly prepared.
*Foam column broke.

Various modifications and variations of this invention will be obvious to a worker skilled in the art and it is to be understood that such modifications and variations are to be included within the purview of this application and the spirit and scope of the appended claims.

What is claimed is:

1. A non-aqueous antifoam composition consisting essentially of a lipophilic nonionic surface active agent having a hydrophilic-lipophilic balance value of less than 9 homogeneously dispersed in a transient siloxanate antifoam agent, wherein said siloxanate antifoam agent consists essentially of the product resulting from heating, in the absence of water, a mixture consisting essentially of a finely divided silica filler and a condensation product of a partially hydrolyzed trifunctional silane, said condensation product having a residual alkoxy content of at least about 9 percent by weight, said silane being selected from the group consisting of $RSiX_3$ and $RSi(OR')_3$ wherein R is an alkyl radical having 1 to 5 carbon atoms, R' is an alkyl radical having 1 to 4 carbon atoms and X is a halogen atom, wherein the amount ratio of said silica filler to said condensation product ranges from about 1 to about 33 parts by weight of the silica filler per 100 parts by weight of the condensation product, and wherein the amount ratio of said surface active agent to said antifoam agent ranges from about 3 to about 33 parts by weight of the surface active agent per 100 parts by weight of the antifoam agent.

2. An antifoam composition as defined in claim 1, wherein the lipophilic surface active agent is a nonionic organic surface active agent.

3. An antifoam composition as defined in claim 1, wherein the lipophilic surface active agent is a nonionic siloxane surface active agent.

4. An antifoam composition as defined in claim 1, wherein the amount ratio of said surface active agent to said antifoam agent ranges from about 5 to 25 parts by weight of the surface active agent per 100 parts by weight of the antifoam agent.

5. An antifoam composition as defined in claim 4 wherein the filler is fumed silica, R is a methyl radical, R' is an ethyl radical and X is a chlorine radical, wherein the condensation product has a residual ethoxy content of from about 40 to about 50 percent by weight, wherein the amount of ratio of said filler to said condensation product ranges from about 3 to about 20 parts by weight of the filler per 100 parts by weight of the condensation product and wherein the heating temperature ranges from about 80° C. to about 200° C.

6. An antifoam composition as defined in claim 5, wherein the mixture is sheared and then heated at a temperature in the range of about 100° C. to about 170° C. for at least one-half hour.

7. An antifoam composition as defined in claim 6, wherein the lipophilic surface active agent is a nonionic organic surface active agent.

8. An antifoam composition as defined in claim 6, wherein the lipophilic surface active agent is a nonionic siloxane surface active agent.

9. An antifoam composition as defined in claim 8, wherein the siloxane surface active agent consists essentially of siloxy units of the formula $R_3SiO_{0.5}$, $R_2SiO$ and $[R'''(R'')_nR'+Si(R)O$ wherein R is a methyl radical, R' is a divalent propylene radical, R'' is an oxyalkylene group, R''' is an alkoxy radical of 1 to 4 carbon atoms and $n$ is an integer.

10. An antifoam composition as defined in claim 9, wherein the condensation product has a viscosity of about 10 to 20 centipoises at 25° C.

* * * * *

UNITED STATES PATENT OFFICE
CERTIFICATE OF CORRECTION

Patent No. 4,101,442            Dated July 18, 1978

Inventor(s) M.R. Rosen

It is certified that error appears in the above-identified patent and that said Letters Patent are hereby corrected as shown below:

Column 3, line 19, change "is" to read --if--.

The write-up for "TEST II" in column 11, lines 36 to 63 should follow the write-up for "TEST I" ending at column 12, line 61 and precede the write-up for "TEST III" beginning at line 62 of column 12.

Column 14, line 48, change "XVIX" to read --XIX--.

At Column 15, lines 53 to 55 and again at Column 18 lines 24 to 26 change the Roman Numeral Column

| "LVXIX | to read | ---LXIX |
|--------|---------|---------|
| LVXX   |         | LXX     |
| LVXXI" |         | LXXI ---| in each instance.

Column 21, line 43 between footnotes "**" and "++" for TABLE 7 insert the omitted footnote ---+Average results of four runs (Standard deviation after 5 minutes about 30)---.

Signed and Sealed this

Twenty-second Day of May 1979

[SEAL]

Attest:

RUTH C. MASON  
Attesting Officer

DONALD W. BANNER  
Commissioner of Patents and Trademarks